United States Patent
Gurol

[19]

[11] Patent Number: 6,143,221
[45] Date of Patent: Nov. 7, 2000

[54] AGGLOMERATING AND DRYING APPARATUS

[75] Inventor: I. Macit Gurol, Seattle, Wash.

[73] Assignee: TAMER International, Ltd., Seattle, Wash.

[21] Appl. No.: 09/267,192

[22] Filed: Mar. 12, 1999

[51] Int. Cl.[7] ........................................... B29B 9/00
[52] U.S. Cl. ..................... 264/118; 34/363; 34/368; 34/369; 425/222; 425/308; 425/313
[58] Field of Search ................... 264/117, 118; 425/222, 313, 308; 34/363, 361, 362, 368, 369

[56] References Cited

U.S. PATENT DOCUMENTS

| 94,308 | 8/1869 | Grotz . | |
|---|---|---|---|
| 284,579 | 9/1883 | Towle . | |
| 624,515 | 5/1899 | Mallinson . | |
| 2,626,856 | 1/1953 | Alles . | |
| 3,879,857 | 4/1975 | Neville | 34/10 |
| 4,454,661 | 6/1984 | Klein et al. | 34/57 E |
| 4,480,535 | 11/1984 | Jaxmar et al. | 99/476 |
| 4,528,761 | 7/1985 | Kölhi | 34/35 |
| 4,588,366 | 5/1986 | Glatt | 425/222 |
| 5,984,212 | 11/1999 | Andreae-Jackering | 241/19 |

OTHER PUBLICATIONS

Johnson and Peterson, "Agglomrization (Instantizing)," Encycl. of Food Technology, AVI Westport, CT, 1974.

Primary Examiner—Mary Lynn Theisen
Attorney, Agent, or Firm—Christensen O'Connor Johnson Kindness PLLC

[57] ABSTRACT

Apparatus for agglomerating and drying particulate material, including an agglomerator (4) for forming and discharging wet granules of a predetermined size or smaller, and a dryer (12). The agglomerator utilizes a rotary blade assembly (100) that repeatedly impacts and cuts the wet mixture of material to be agglomerated, which is forced radially outward through the blade assembly under centrifugal and air pressure force. Wet granules pass through an annular screen (104) where they reach a predetermined maximum size. The dryer has an inlet (50) for wet granules from the agglomerator, an outlet (78) for granules having passed through the dryer, and one or more baffles (64) within the dryer defining a spiral path through which the granules pass from the dryer inlet towards the dryer outlet. The baffles are configured such that their pitch increases with distance from the dryer inlet, whereby the cross-sectional area of the spiral path increases toward the dryer outlet.

30 Claims, 4 Drawing Sheets

AGGLOMERATING AND DRYING APPARATUS

FIELD OF THE INVENTION

The present invention relates to agglomerating apparatus, drying apparatus, and systems including both agglomerating and drying apparatus. The invention also relates to methods for agglomerating and drying particulate materials.

BACKGROUND OF THE INVENTION

Granules are widely used in food, pharmaceutical, agricultural, paint and chemical industries. Practically every tablet we take is granulated before it is made into a tablet. Household cleaning substances, fertilizers, animal feed, sugar, salt and just about every dry item that contains multiple ingredients is used in granule form.

There are dozens of reasons why granules are used and needed. The following are four of the main ones:

1. In multi-ingredient tablet manufacturing it is important that each tablet contains the same ratio of ingredients as the overall batch, otherwise the effectiveness of every tablet will be different. The only way to avoid this problem is to convert complex powder and liquid formulas into uniform granules that contain the correct ratio of ingredients, then press the tablets from these granules. There are two criteria in manufacturing a high quality tablet. One is compressability, which is the ability to compress the granule to bind and form a tablet. The second criterion is content uniformity which is the ability to have the same ratio of ingredients distributed throughout the entire tablet.

2. Granules flow very easily due to their uniform size and moisture level. Fine powders clog, pack or clump, and do not flow well. Process machines do not work well with powders. A solution to this problem is to convert complex powder and liquid formulas to granules.

3. Fine powders do not mix into liquids easily. Experience shows that fine particles are more difficult to mix, they clump up and float in or on top of the liquid. One solution to this problem is to convert powders into granules.

4. When multiple component mixtures are transported, due to density differences in each ingredient, heavier ones will migrate toward the bottom and lighter ones will come to the surface. To prevent this from happening, mixtures are first converted to granules.

Granules can be formed in two ways; they can be ground from a larger solid mass and then sifted to obtain the proper granule size (size reduction). This process is called Granulation. The second method is to mix the various powdered ingredients with a liquid and a binder to form larger particles (size increase). This process is called Agglomeration.

The Tamer™ Agglomeration System uses a damp agglomeration approach starting with mixing the powder and liquids. This is done in a separate PLC-controlled mixer with a unique mixing and cutting blade system. The mixed formula then goes through the size reduction process with a second set of cutting heads. As the newly formed granules exit this stage they are transported through an intermediate heater into a vacuum dryer. The granules are then deposited into a finished goods bin through a unique vacuum valve depositor.

The system is very energy efficient and extremely compact. Two 500 lb. machines can be placed in a 10×10 foot room with an eight foot ceiling. The only connections required are a moisture exhaust and electric power. Although only a small portion of product is in the machine at any time, the yield is equal to batch production processes since the machine handles the product in a continuous stream. The finished product from the Tamer Agglomeration System is 100% usable. The Tamer Agglomeration System lowers costs significantly in initial installation, space, energy consumption and labor versus all other comparable systems currently available on the market. The Tamer Agglomeration System can produce complex powder and liquid formulas in small and large batches. We are not aware of any other agglomeration equipment that can make that claim.

These systems will be available in three sizes: A 100 lb. per day tabletop laboratory model, a 500 lb. per day model, and a 2000 lb. per day mid sized production model. The Tamer Agglomeration System is designed to allow for great repeatability, control, and flexibility. We can design any level of production capability you require in 2000 lb. increments. This gives the manufacturer a flexible system that can be committed to large batch production or several smaller production projects.

SUMMARY OF THE INVENTION

In one aspect, the present invention provides apparatus for drying particulate material, preferably granules, which includes an enclosed path through which the particulate material is conveyed in a fluidized stream. The cross-sectional area of the path, which preferably has a spiral form, increases in the direction in which the fluidized stream flows.

Preferably, the drying apparatus includes a drying chamber having an inlet for the fluidized stream of particulate material, and an outlet for the particulate material having passed through the drying chamber. A spiral path for the fluidized stream may be defined by one or more baffles fixed within an annular drying chamber. For example, a continuous spiral baffle may be provided to form a path from the drying chamber inlet towards the outlet, the pitch of the spiral increasing with distance from the inlet to give the desired increase in cross-sectional area of the path.

It has been demonstrated that a dryer of this construction can be particularly efficient, while requiring significantly less heating energy than a comparable prior art dryer of the spray or fluidized bed types. A dryer of this construction can also readily be used in a continuous process for manufacturing granules.

In another aspect, the invention provides an agglomerator apparatus including a rotary blade assembly with a plurality of blades that are configured such that, during operation of the agglomerator, material acted on by the blades is urged to follow a generally sinusoidal path relative to a plane in which the blades are rotating. This sinusoidal motion increases the volume of material impacted by the blades and hence can be beneficial to the efficiency of the agglomerating process.

To meter the size of particles generated by the agglomerator apparatus, a mesh screen or other barrier is arranged circumferentially around the rotary blade assembly, the screen or other barrier being configured to prevent the material being agglomerated escaping from the rotary blade assembly before it has been reduced to particles of a desired size or smaller. Once the particles are sufficiently small, they will tend pass through the screen or barrier as a result of centrifugal forces acting upon them, and the particles can be collected on the radially outer side of the screen or barrier to be passed to a dryer if required. Such an arrangement has been shown to give a relatively narrow distribution of granule size, with substantially no fines (3% or less).

In a preferred form, the blades of the rotary blade assembly are arranged in a circumferential array around a central hub about which they rotate in a rotary plane. The cutting edge of each blade is defined on an outer end portion of the blade and faces the direction of rotation. The radially outer end portions of adjacent blades in the circumferential direction are angled or twisted out of the rotary plane in opposite directions about respective radial axes, in alternating fashion, so that the cutting edges of adjacent blades are respectively above and below the rotary plane.

In a further aspect, the present invention provides apparatus for agglomerating and drying particulate material which comprises an agglomerator for forming and discharging wet granules of a predetermined size or smaller, and a dryer having an inlet for wet granules from the agglomerator, an outlet for granules having passed through the dryer, and one or more baffles within the dryer defining a spiral path through which the granules pass from the dryer inlet towards the dryer outlet. The agglomerator and/or the dryer may include one or more of the features discussed above.

In yet another aspect, the present invention provides a method of drying particulate material in which the material is conveyed in a fluidized stream through an enclosed path, preferably a spiral path, which increases in cross-sectional area in the direction in which the fluidized stream flows.

The invention also provides, in a still further aspect, a method of agglomerating a particulate material which includes urging the material to follow a sinusoidal path within a rotary blade assembly during agglomeration.

Also provided by the invention is a method of preparing granules, in which a mixture is formed of particulate material and a liquid. The mixture is fed into an agglomerator and agglomerated to form granules of a predetermined size or smaller, and the granules are dried by passing them through an expanding, preferably spiral, path.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
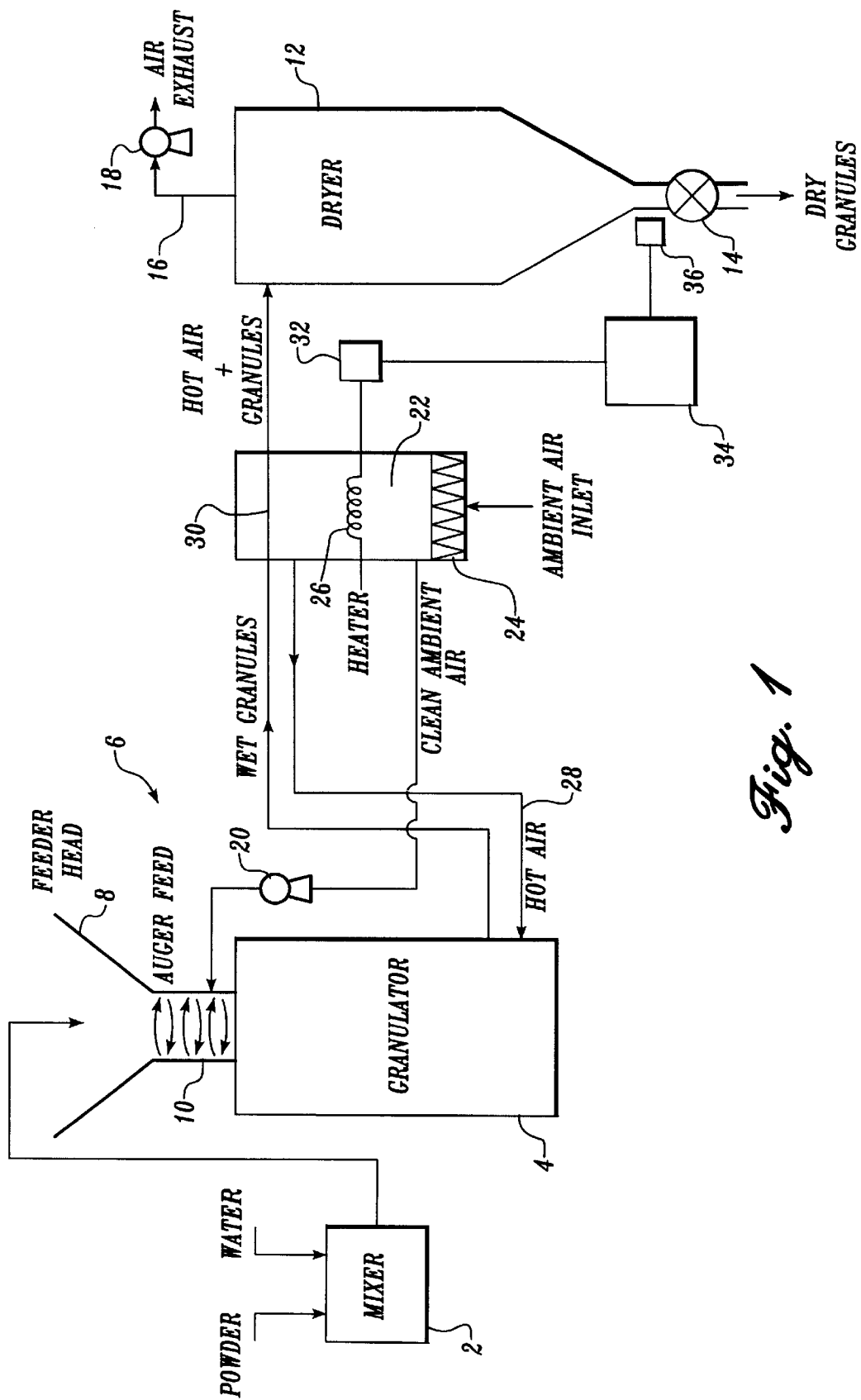
FIG. 1 schematically illustrates a system for producing granules in accordance with an embodiment of the present invention.

FIG. 1 illustrates a system for agglomerating and drying particulate material. The system includes a mixer 2 in which the desired formulation of powders are mixed with water, or another suitable binder, to form a dough. Dough from the mixer 2 is passed to an agglomerator 4. The agglomerator 4 has a feeder head 6, which includes a hopper 8 into which the dough is loaded and an auger 10 which feeds the dough from the base of the hopper 8 into the agglomerator 4 itself. In the agglomerator 4, the dough is broken down into granules of a predetermined desired size or smaller, and the granules are then fed to a dryer 12. The granules are dried in the dryer 12 and collect at the base of the dryer 12 where they can be discharged through a discharge valve 14. Moisture that has been driven out of the granules during the drying process is exhausted through an air exhaust 16 at the top of the dryer, with the aid of a vacuum pump 18 which draws a negative pressure on the air exhaust 16.

For reasons explained below, it is desirable to inject air into the inlet of the agglomerator 4 under a positive pressure. Thus, a pump 20 is provided to supply filtered ambient air to the agglomerator inlet from an air inlet plenum 22 which receives ambient air through a filter 24. The filter 24 and plenum 22 also supply heated air to both the agglomerator 4 and the dryer 12 to aid the drying of the granules. Air from the filter 24 and plenum 22 thus passes through a heater 26. From the heater 26, one stream 28 of hot air is fed to the agglomerator 4 and another stream 30 of hot air is introduced to the granules as they are fed from the agglomerator 4 to the dryer 12.

The amount of heat imparted to these hot air streams 28, 30, in particular the hot air stream 30 introduced to the path between the agglomerator 4 and the dryer 12, has a significant influence on the dryness of the granules discharged from the dryer 12. Consequently, in the preferred embodiment, a power control 32 for the heater 26 is used along with an automated adaptive controller 34, to control the power to the heater 26, and hence the heat imparted to the hot air streams 28, 30. Specifically, the heat is controlled in response to the final moisture content of the granules exiting at the base of the dryer 12. The moisture content of the granules can be measured, for example, using a microwave moisture detector 36, or other, preferably non-intrusive, detectors. The use of such a control mechanism enables the system to be used to consistently produce granules of a selected, desired moisture content to ensure the granules do not break apart or clump.

Figure 2:
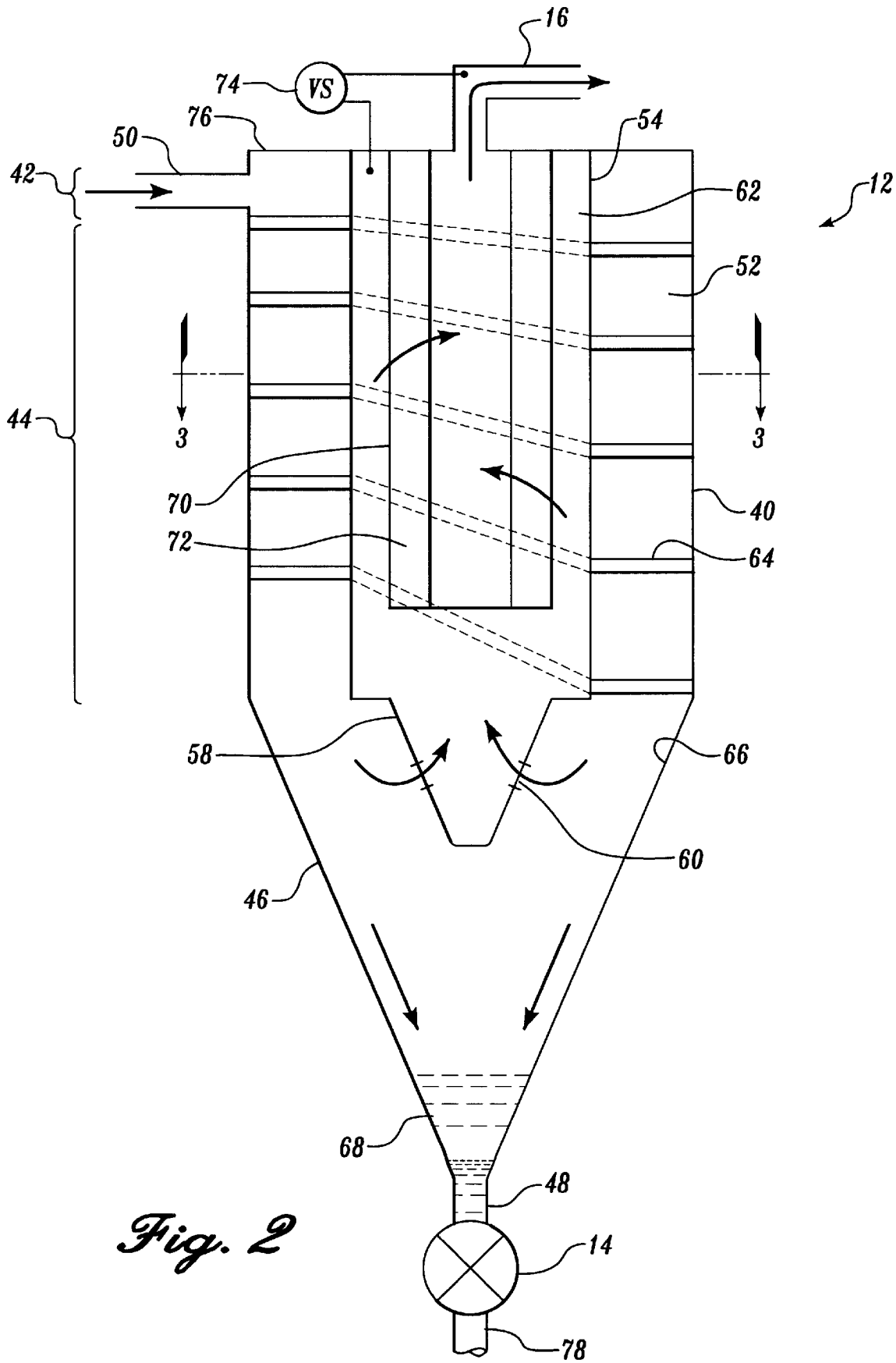
FIG. 2 is a schematic cross-sectional side view of the dryer of FIG. 1 sectioned along the longitudinal axis thereof.
Figure 3:
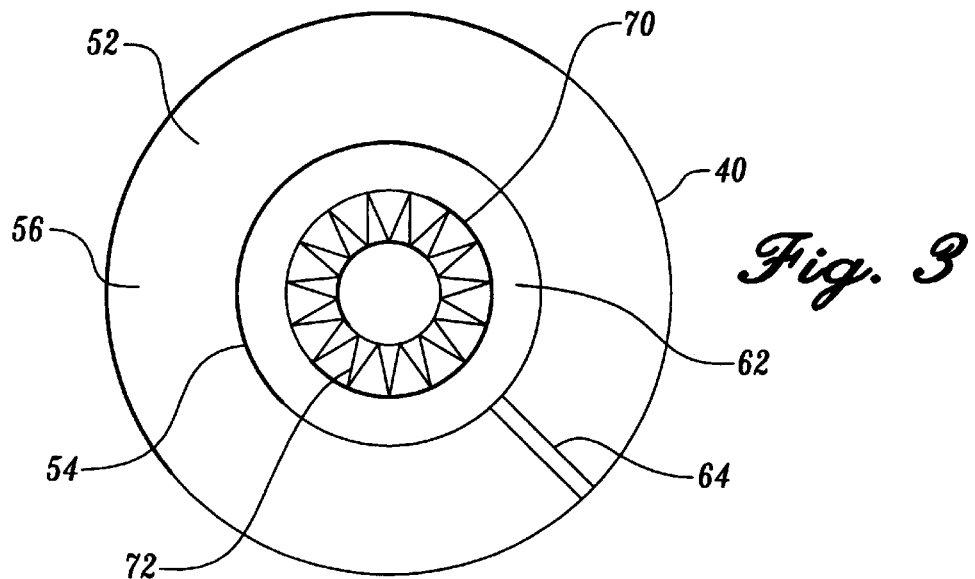
FIG. 3 is a schematic cross-sectional plan view of the dryer of FIG. 2, sectioned on 3—3.

With reference to FIGS. 2 and 3, the dryer 12 is now described in greater detail. The main structure of the dryer 12 is formed from a cylindrical tower 40 having a top portion having a constant, circular cross section (seen in FIG. 3), and a frustoconical bottom portion 46 that tapers downwardly towards a granule outlet 48 at the base of the dryer tower. "Wet" granules (typically having a moisture content of about 18% by weight, by way of example) enter the tower through an inlet 50 in an upper end of the top portion 42, carried by the hot air stream 30 in a fluidized stream. The fluidized stream of granules follows a spiral path 52 downwardly through the top portion 44 of the tower 40 and then fall into the conical, bottom portion 46, where the "dry" granules are collected. The term "dry" here is used to refer to granules that have passed through the drying tower, rather than particles that necessarily have a 0% moisture content. In fact, to ensure that the granules remain bound, their moisture content after drying will suitably be in the range 5%–110% or as otherwise selected.

A central, tubular core 54, of a circular cross section, extends coaxially with the tower through the top portion 44 thereof. The core 54 has an outside diameter significantly smaller than an internal diameter of the tower 40, forming an annular cavity 56 between the wall of the tower 40 and the core 54. A bottom end of the core 54 has a conical projection 58 which protrudes downwardly into the lower portion 46 of the tower. The conical projection 58 has one or more openings 60 therein to allow air to pass from the bottom portion 46 of the tower upwardly into the core 54, but otherwise the core 54 is closed off from the interior of the tower 40.

The core 54 extends all of the way to the top of the tower 40 to fluidly connect with the air exhaust 16, which exhausts air from the core 54. Thus, the central core defines an exhaust duct 62 for taking air from the lower portion 46 of the tower, carrying the air up through the center of the tower 40, and exhausting it at the top of the tower 40, leaving the dry granules at the base of the tower 40. To aid this exhausting of the air, a vacuum pump 18 is suitably coupled in-line to the air exhaust (see FIG. 1) to draw a negative pressure on the exhaust duct 62.

The drawing of a negative pressure on the exhaust duct 62 and, via the exhaust duct 62, on the interior of the dryer tower 40, has the additional benefit of lowering the pressure in the tower 40. This is beneficial to the drying process because it accelerates the evaporation of water from the granules as they flow through the tower 40.

The spiral path 52 followed by the fluidized stream of granules from the inlet 50 towards the base of the tower 40 runs through the annular cavity 56 defined between the core 54 and the outer wall of the tower 40. A continuous baffle 64 spirals downwardly through the annular cavity 56, and is of the same width as the annular cavity 56, so that it extends radially from the outer surface of the core 54 to the inner surface all of the tower 40, whereby an enclosed spiral path 52 is defined by the baffle 64, the central core 54, and the top portion 44 of the tower 40. The spiral baffle 64 starts adjacent the inlet 50 to the tower 40 and terminates at the lower end of the top portion 44 of the tower, to define an exit from the spiral path, from where the granules are discharged to the bottom portion 46 of the tower 40. The spiral baffle 64, tower 40 and central core 54 cooperatively define an elongate duct formed along a spiral path.

The spiral baffle 64 has a pitch that increases in the downward direction, so that the cross-sectional area of the spiral path 52 through which the fluidized stream of granules flows increases, preferably linearly, in the direction of flow. In the exemplary embodiment described here, the spiral baffle 64 is formed from a series of joined, split annular baffles.

In use, a fluidized stream of wet granules, in this case wet granules carried in a hot air stream, enters the inlet 50 at the top end 42 of the dryer tower 40 and proceeds downwardly along the expanding spiral path 52. As the granules flow along the spiral path 52 they give up moisture to the hot air and are thus dried. As the moisture evaporates from the granules it is entrained as vapor in the hot air stream, and thus results in a volumetric increase of the air stream. Preferably, the rate of expansion of the spiral path 52 in the downward direction is selected to accommodate this volumetric increase, in order to substantially avoid any compression of the air stream resulting from moisture evaporation. It is desirable to avoid this compression, because the resulting increased pressure would slow the evaporation of moisture from the granules, and thus be detrimental to the efficiency of the drying process.

When the granules reach the exit from the spiral path 52 at the transition between the top portion 44 and bottom portion 46 of the tower 40, they have a significant velocity component in a tangential direction of the tower 40. Consequently, the granules tend to spiral down the conical inner surface 66 of the tower 40 in the bottom portion 46, in a cyclonic-type manner, to the bottom of the tower 40, which serves as a collection chamber 68 for the dry granules. Meanwhile, the by now warm, moist air is drawn upwardly, under the influence of the vacuum pump 18 attached to the air exhaust 16, through the openings 60 in the conical projection at the bottom of the central core 54, up through the core 54 and out of the exhaust 16. In this way, the warm, moist air is separated from the dry granules.

The cyclonic-type motion of the granules in the bottom portion 46 of the dryer tower 40 discourages them from traveling up through the central core 54. However, in order to substantially prevent granules which break away from the cyclone from being carried out through the air exhaust 16, a filter 70 is placed in the flow path between the lower portion 46 of the tower 40 and the air exhaust 16. In the example illustrated, a cylindrical filter element 72 is used which extends vertically and coaxially within the core 54. The bottom end of the filter 70 is closed and the top end of the filter 70 is sealed around the exhaust 16. Thus, the only flow path from the lower end of the core 54 to the exhaust 16 is through the cylindrical filter element 72. As best seen in FIG. 3, the preferred filter element has a pleated concertina-type form, constructed from a porous fabric or paper, but any of a number of different filters may be used in its place.

Although the cyclonic-type flow of the granules in the lower portion 46 of the dryer tower 40 means that very few granules are typically drawn up into the central core 54, it is possible that, over time, the filter element 72 will start to become clogged and thus reduce the efficiency of the dryer. It is desirable to be able to detect the clogging of the filter element 72, and for this reason a differential pressure gauge 74 is suitably connected across the exhaust 18 and the central core 43 radially outwardly of the filter element 72, to detect the pressure drop across the filter element 72. As the filter element 72 becomes clogged, the pressure drop across the element 72 will increase. This increase in pressure drop can be monitored, and the filter 70 can be replaced once the pressure drop exceeds a predetermined level which has been established as corresponding to an undesirable level of clogging of the filter element 72. It is particularly preferred that the replacement of the filter 70 be facilitated by constructing the tower to have a removable top cover 76, normally sealed closed to the upper edge of the top portion 44. To replace the filter, the top cover 76 is lifted free of the tower 40, exposing the filter 70, which can then simply be lifted out and cleaned, or replaced with a fresh filter 70.

The dry granules are discharged from the collection chamber 68 at the base of the dryer tower 40 through a discharge valve 14. Any of a number of suitable valves may be used, but preferably the valve 14 maintains a seal between the interior of the dryer tower 40 and discharge outlet 78, in order that the desired negative pressure can be maintained in the dryer tower 40. For example, one suitable form of valve is a rotary valve 14, in which a rotor rotates within a barrel, the rotor defining a series of radial pockets, separated by radial rotor arms which seal against the inside of the barrel. The pockets transfer granules from the base of the dryer tower 40 to the discharge outlet 78 while at all times maintaining a seal between two of the rotor arms and the barrel of the valve 14 to avoid any direct passages through the valve 14.

Figure 4:
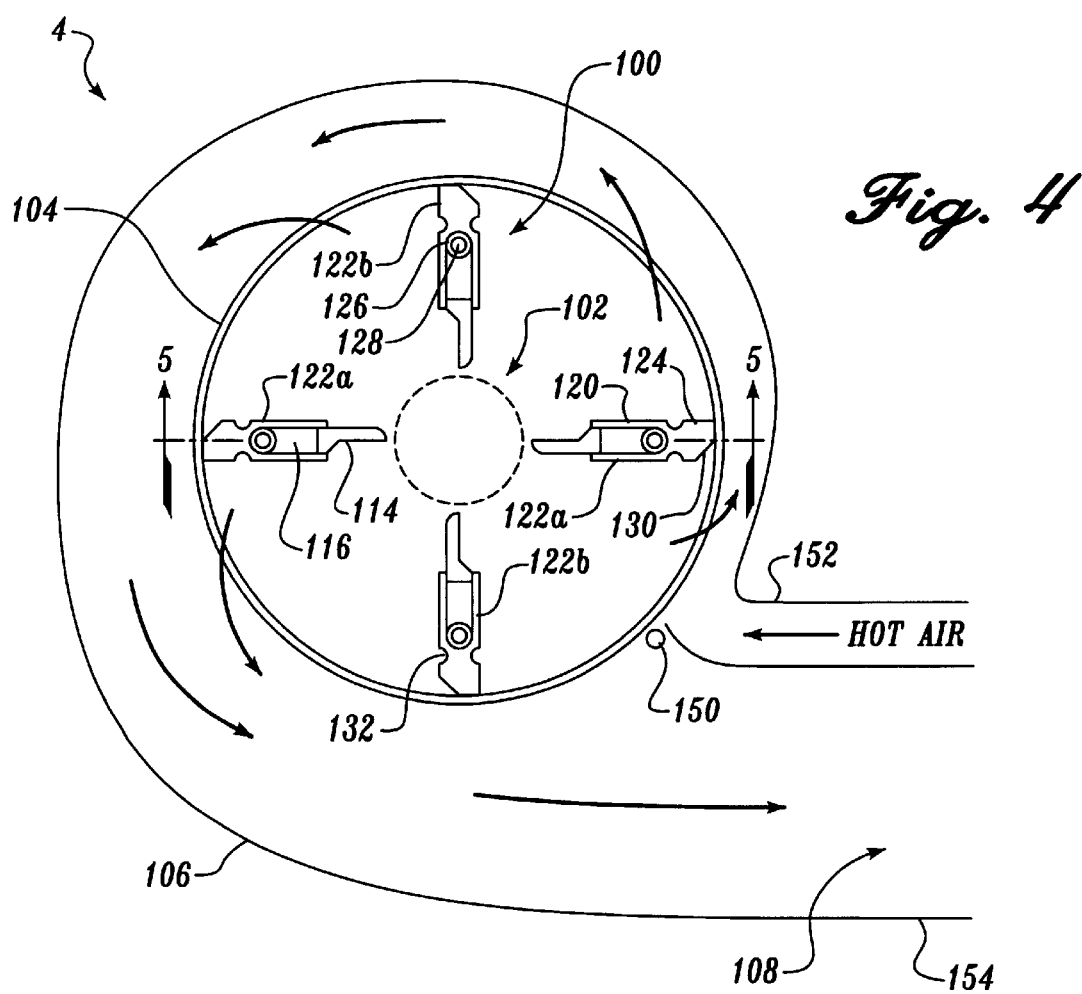
FIG. 4 is a schematic cross-sectional plan view of the agglomerator of FIG. 1 sectioned along a radial plane.
Figure 5:
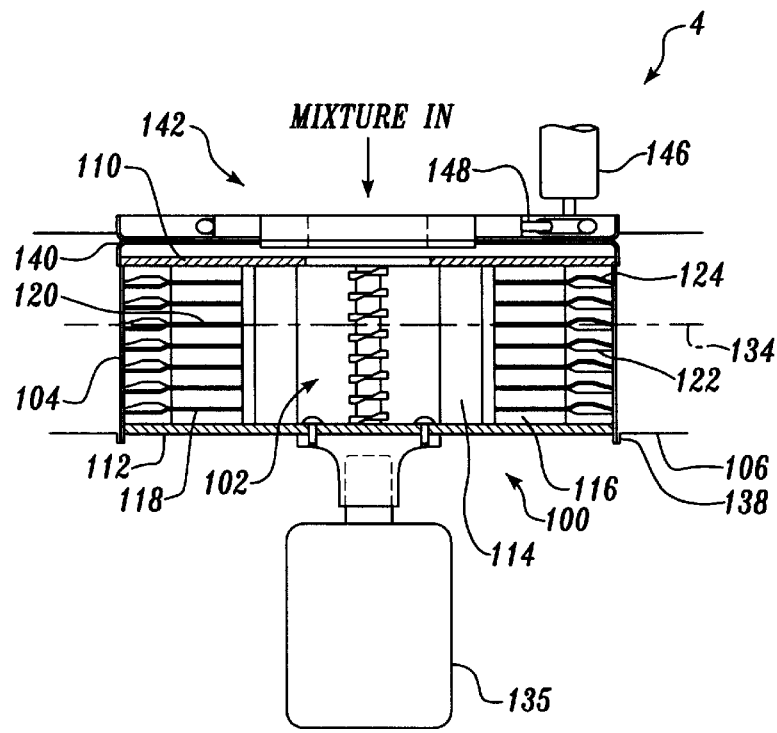
FIG. 5 is a schematic cross-sectional side view of the agglomerator of FIG. 4, sectioned on 5—5.

Referring now to FIGS. 4 and 5, the agglomerator 4 of FIG. 1 is described in greater detail. The principal components of the agglomerator 4 are a rotary blade assembly 100, mounted rotatably about a vertically extending central, open hub region 102, a circular, mesh screen 104, circumferentially surrounding the blade assembly 100, and a volute manifold 106 surrounding the mesh screen, for collecting and directing granules towards an outlet 108 from the agglomerator 4.

The rotary blade assembly 100 includes top and bottom, circular support plates 110, 112 which are rigidly joined to one another, and spaced apart from one another by four support columns 114 equally spaced, in the circumferential direction, about the central, open hub region 102. Each column 114 has an elongate cross section (seen in FIG. 4) extending radially outwardly from the hub region 102 towards the mesh screen 104. A vertical array of horizontal slots 118 is formed in a radially outer portion 116 of each column 114. Each slot 118 receives a base 120 of a respective blade 122. As seen most clearly in FIG. 4, blades 122 are received in the slots 118 in the columns 114, the base 120 of each blade 122 being held in a respective slot 118 and a radially outer tip portion 124 of each blade 122 protruding radially outwardly beyond the respective column 114. When received in the slots 118 in the columns 114, as seen in FIGS. 4 and 5, the blades 122 are arranged in a vertically stacked series of circumferential arrays, in the example shown there being four blades 122 in each of seven circumferential arrays. However, there may be more or less blades 122 in each circumferential array, and more or less circumferential arrays in the blade assembly 100.

The columns 114 each have a vertical bore 126 extending from top to bottom, and the root 120 of each blade 122 has a corresponding aperture. To secure the blades 122 in position, they are first slotted into the column 114 and then a pin 128 is dropped into the bore 126 of the column 114, passing through the aperture of each blade 122 to hold it in place. This relatively simple blade retention mechanism allows for a quick and easy replacement of worn blades. Alternative blade retention mechanisms such as welding or set screws, may be used if desired.

Each blade 122 has a plate-like form, having the radially inward base 120 that is received horizontally in a respective slot 118 in a respective support column 114, and the radially outer tip portion 124 bearing a cutting edge 130, which in use faces the direction of rotation. Between the base 120 and the tip portion 124 of the blade 122, there is a narrowed neck 132. The neck 132 is provided to facilitate twisting of the tip portion 124 relative to the root 120, as will be explained below.

The radially outer tip portion 124 of each blade 122 is twisted about a radial axis, so that the tip portion 124 is angled relative to the horizontal plane 134 in which the blade 122 and the others in the respective circumferential array rotate about the hub region 102. The direction in which the blade tip portion 124 is twisted relative to the horizontal plane alternates from one blade 122 to the next around each circumferential array. Thus, the two blades 122a opposite one another to the left- and right-hand sides of FIG. 4 are twisted so that their cutting edges 130 are below the horizontal plane of rotation 134, whereas the two blades 122b opposite one another towards the top and bottom of FIG. 4 are rotated such that their cutting edges 130 are above the horizontal plane of rotation 134. When the agglomerator is operated, material that is introduced into the rotary blade assembly 100 through a central aperture in the top support plate 10 into the open hub 102 is forced outwardly by centrifugal force and then impacted by the blades 122. Because of the alternating angled tip portions 124 of the blades 122, the material is pushed first upwardly and then downwardly, imparting to it a generally sinusoidal-type motion. This increased agitation of the material being agglomerated brings a greater volume of the material into contact with each blade 122, and thus increases the efficiency of the agglomerating process.

The rotary blade assembly is driven by a primary motor 135 (FIG. 5), which in the present example is connected directly to the bottom support plate 112 of the blade assembly 100. Alternatively, the primary motor 135, or other drive means, may drive the blade assembly through a drive mechanism employing belts, gears and/or other drive elements. The primary motor 135 typically drives the blade assembly at a speed of about 1800–10,000 rpm.

Figure 6:
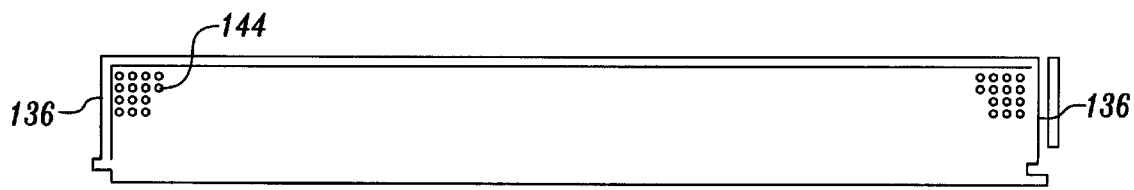
FIG. 6 illustrates an unfolded mesh screen used in the agglomerator of FIG. 4.

The mesh screen 104 is suitably formed from a flat, elongate, rectangular screen, seen in FIG. 6, which is wrapped around the periphery of the rotary blade assembly 100, and its ends 136 are secured together to form the desired, continuous circular screen 104. As seen in FIG. 5, the lower edge of the screen is received in a channel 138 formed in a base wall of the manifold 106, radially outwardly of the lower support plate 112 of the blade assembly 100. For reasons explained below, the screen 104 is free to rotate around its central axis within this channel 138. The upper edge of the mesh screen 104 is attached to an inverted dish shape support element 140, which itself is attached to a hub assembly 142 rotatable relative to the manifold 106 and the rotary blade assembly 100. The mesh screen is formed with a two-dimensional array of through openings 144 (only a small number of which are illustrated in FIG. 6), the size of these openings 144 corresponding to the largest desired size of granule. A set of such mesh screens may be provided for the agglomerator 4, having a variety of different opening sizes, so that an appropriate mesh screen 104 can be selected for the size of granule desired. Advantageously, the size of granule to be produced can be controlled simply by selecting this one component.

In addition to the primary motor 135, an auxiliary motor 146 is suitably provided to slowly rotate the mesh screen 104 about the hub assembly 142, typically at a rate of about 1 rpm. Here, a belt drive 148 is used to give the desired step down in speed from the motor 146 to the hub assembly 142. Preferably, the screen 104 co-rotates (but at a much lower speed), with the rotary blade assembly 100, because counter-rotation would result in a greater shear force applied to the screen 104 by the material being agglomerated.

The mesh screen 104 is rotated in order to periodically traverse the entire circumference of the screen 104 in front of a screen cleaning device 150 (see FIG. 4), which in the present example is a vertically extending compressed air gallery disposed adjacent, but radially outwardly of the mesh screen 104, and having a vertical series of jets, which direct compressed air against the screen 104 to blow out impacted material from the mesh openings 144.

In use, a dough mixture of the desired powder formulation and water is fed, in the present example by the auger 10, into the central, open hub 102 of the rotary blade assembly 100. From there the dough is thrown radially outwardly into the path of the rapidly rotating blades 122 and, as explained above, forced to follow a generally sinusoidal path as the blades 122 repeatedly impact the material and cut it down into smaller granules. As the material is fed into the hub 102 and rapidly thrown outwardly, there is a tendency for a negative pressure to develop at the hub 102. To counter this, a supply of air is preferably pumped into the hub 102 to negate this naturally occurring negative pressure and preferably is regulated to provide a net positive pressure in the hub 102 to further enhance the radially outward flow of material. This air supply is provided by the pump 20 in FIG. 1.

Once the material has been agglomerated for a period of time, granules of a size small enough to pass through the openings 144 in the mesh screen 104 are developed and pass outwardly through the screen 104 into the manifold 106. To carry the granules along the manifold 106 from where they pass through the mesh screen 104 to the agglomerator outlet 8, a flow of air is introduced at the inlet end 152 of the manifold 106, under positive pressure if desired, and a vacuum is drawn on the outlet end 154 of the manifold 106. This vacuum may be that arising as a result of the outlet 108 from the agglomerator 106 connecting to the inlet 50 of the dryer 12 which has a vacuum drawn on its air exhaust 16. Alternatively, an additional vacuum pump may be used.

In the preferred embodiment, the air flowing through the manifold is heated prior to introduction to the manifold 106, by the heater 26 in FIG. 1. As the granules pass through the mesh screen 104 into this hot air flow, the outer surface of each granule is rapidly dried, forming a surface crust, and helping to prevent the granules from re-combining with one another.

The mixer and other components of the system illustrated in FIG. 1, including the feeder head, the air filter and heater, the pumps, valve and controllers, can be any of a number of suitable components, examples of which are known in the art. Similarly, the various components of the system can be made of any of a number of suitable materials, many examples of which will be readily known to those skilled in the art. Optionally, the materials used can be selected to be appropriate for use in sterile environments, such as for the manufacturer of pharmaceuticals and food-stuff, and may for example be stainless steels or sterilizable plastics such as UHMW Polyethylene.

An overall procedure for operation of the system of FIG. 1 is now summarized. First, the desired formulation of powder, or other particulate material, and a binder such as water, are loaded into the mixer 2, where they are mixed to the consistency of a dough, typically with a moisture content of about 23%–25% by weight. Advantageously, the mixer may be selected to provide a continuous flow of mixture to the agglomerator 4, or a number of batch-type mixers may be used that between them provide a pseudo-continuous flow to the agglomerator 4 in order that the remainder of the process may be operated in a continuous manner. Furthermore, because the mixture is initially mixed to a dough, a very even distribution of the particulate material is possible. This in turn means that the system can be readily used for multiple component formulations, for example, including up to 12 components or more.

From the mixer, the dough is loaded into the feeder head 6 of the agglomerator 4, and the auger 10 feeds the material into the rotary blade assembly 100 of the agglomerator 4. The dough is then broken down into small granules which pass radially outwardly through the mesh screen 104 into the manifold 106. The wet granules are then carried in a hot air stream in the manifold 106 to the agglomerator outlet 108 and onto the dryer inlet 50. The agglomerating process, and in particular the use of a hot air stream in the manifold, begins to dry the granules. Additionally, on the way to the dryer inlet 50, a further stream of hot air having a temperature of about 160° F. or higher, optionally as high as 250° F., is combined with the wet granules to enhance the drying process. At the dryer inlet, the moisture content of the granules will suitably be about 18% by weight. The air stream and the granules proceed through the downwardly spiraling path in the dryer 12 to the bottom portion 46 of the dryer tower 40 where the dry granules are collected and discharged suitably at a moisture content of about 7%–8% by weight. The warm, moist air is drawn back up through the central core 54 of the dryer tower 40 and exhausted through the air exhaust 16. The granules can be collected as they are discharged from the dryer tower 40 and subjected to further processes if desired, for example, sifting, quality checking and/or packaging processes.

Advantageously, the system and/or its various components can be operated in a continuous production manner, or alternatively, a batch production manner; the quantity of material passing through the system has been found to have no effect on the quality of the end product. Furthermore, since the heat supply to the system need not be as high as prior art systems, the system is particularly efficient or may also be used to make granules including heat-sensitive and biological ingredients that may be damaged by the very high temperatures that exist in the prior art systems.

While the preferred embodiment of the invention has been illustrated and described, it will be appreciated that various changes can be made therein without departing from the spirit and scope of the invention. For instance, the preferred embodiment has been described as comprising both the agglomerator 4 and the dryer 12 of the present invention, but these components are also independently useful. In particular, the dryer 12 may be used to dry granules, or other particulate material, formed by any of a number of processes, such as those known in the prior art. On the other hand, granules formed in the agglomerator 4 of the present invention can be dried in apparatus other than the dryer tower 12 described, such as dryer apparatus known in the prior art. Also, as an alternative to, or in addition to employing heated gas streams to facilitate the drying of the granules, dry streams of gas, e.g., air or nitrogen may be used for the same purpose.

The embodiments of the invention in which an exclusive property or privilege is claimed are defined as follows:

1. An apparatus for drying particulate material, the apparatus comprising:
   (a) a drying chamber having an inlet for particulate material conveyed in a fluidized stream, and an outlet for the particulate material having passed through the drying chamber; and
   (b) a baffle fixed within the drying chamber defining a spiral flow path for the fluidized stream of particulate material from the inlet towards the outlet, the spiral flow path having a cross-sectional area increasing in size with distance from the inlet.

2. The apparatus of claim 1, wherein the baffle extends in a continuous spiral from the drying chamber inlet towards the outlet, the pitch of the spiral increasing with distance from the inlet.

3. The apparatus of claim 1, further comprising a vacuum pump in fluid flow communication with the outlet of the drying chamber to create a pressure differential across the spiral flow path, the pressure at the drying chamber inlet being greater than the pressure at the drying chamber outlet.

4. The apparatus of claim 1, further comprising a blower in fluid flow communication with the inlet of the drying chamber to increase the pressure of the fluidized stream at the inlet relative to the pressure of the outlet.

5. The apparatus of claim 1, further comprising a heater through which the fluidized stream flows.

6. The apparatus of claim 5, wherein the heater is disposed to heat the fluid stream as it enters the dryer chamber inlet.

7. The apparatus of claim 5, further comprising a controller for the heater, whereby the amount of heat supplied to the fluidized stream by the heater is adjusted based on a moisture content of particulate material leaving the dryer outlet.

8. The apparatus of claim 1, wherein the fluidized stream comprises the particulate material and a carrier gas, and the drying chamber has a gas outlet separate from the drying chamber outlet for the particulate material, for exhausting the carrier gas from the drying chamber once it has passed through the spiral flow path.

9. The apparatus of claim 8, comprising a carrier gas exhaust conduit extending from within the drying chamber from the vicinity of the drying chamber outlet to the gas outlet, the exhaust conduit extending through the center of the spiral flow path, concentrically therewith.

10. The apparatus of claim 9, wherein the drying chamber comprises a cylindrical outer shell and a coaxial cylindrical inner shell, the inner shell forming the gas exhaust conduit, the baffle being disposed coaxially within an annular space defined between the inner and outer shells.

11. The apparatus of claim 9, comprising a filter separating the drying chamber outlet from the gas outlet, the filter presenting a barrier to the particulate material.

12. The apparatus of claim 1, wherein the spiral flow path defined by the baffle terminates at an outlet end short of the drying chamber outlet, the drying chamber having a conical portion tapering from the outlet end of the spiral path to the drying chamber outlet to direct the particulate material from the spiral path to the outlet.

13. The apparatus of claim 1, wherein the ratio of the length of the drying chamber, measured along a central axis of the spiral path, to the length of the spiral path is no greater than 1:10.

14. The apparatus of claim 1, wherein the particulate matter comprises agglomerated powders, further comprising an agglomerator connected in fluid flow communication with the inlet of the drying chamber.

15. An apparatus for drying wet granules formed of powder and liquid in a gaseous carrier stream, the apparatus comprising:
(a) an enclosed elongate duct, the duct having an inlet and outlet and defining a cross-sectional area that increases in size with distance from the inlet to the outlet; and
(b) a heater in fluid flow communication with the duct to dry liquid from the wet granules.

16. The apparatus of claim 15, wherein the elongate duct is formed to define a spiral flow path.

17. A agglomeration system for forming granules from powder, comprising:
(a) an agglomerator for forming wet granules from a mixture of powder and liquid;
(b) a carrier gas source coupled to the agglomerator for suspending the wet granules in a fluidized stream; and
(c) a dryer having an inlet for receiving the fluidized stream and an outlet for discharging dry granules, and defining an elongate duct extending from the inlet to the outlet, the elongate duct defining a cross-sectional area that increases in size in proportion to a distance from the inlet.

18. An apparatus for drying granular material, the apparatus comprising:
an elongate drying tower having an outer wall having a top portion and a bottom portion;
a material inlet in the top portion of the drying tower for a fluidized stream of granules including the granules and a carrier gas;
the bottom portion of the drying tower defining a collection chamber for the granules and having an outlet for discharging the granules from the collection chamber;
a central, tubular gas exhaust duct extending within the drying tower to convey the carrier gas from the collection chamber to a gas exhaust in the top portion of the drying tower;
a pump coupled to one of the inlet or outlet for inducing a differential pressure therebetween; and
a continuous guide strip extending in a spiral between the drying tower outer wall and the central exhaust duct along a length of the top portion of the drying tower, to define a spiral path for conveying the fluidized stream of granules from the material inlet to the collection chamber, the pitch of the spiral increasing from the material inlet to an outlet of the spiral path from which the granules are discharged into the collection chamber.

19. A method of drying agglomerated powder and liquid comprising conveying the particulate material in a fluidized stream in a flow direction through an enclosed path towards an outlet end of the path, the path increasing in cross-sectional area in the flow direction.

20. The method of claim 19, wherein the enclosed path is a spiral path.

21. An agglomerator apparatus comprising:
a rotary blade assembly the rotary blade assembly including a plurality of blades arranged in a circumferential array around a central hub, the blades rotatable about the hub in a rotary plane, each blade having a radially outer end portion with a cutting edge facing the direction of rotation;
a mesh screen circumferentially surrounding the rotary blade assembly, the mesh screen having a mesh size selected to allow particles of a predetermined size or smaller to pass from the rotary blade assembly through the mesh screen; and
a manifold surrounding the mesh screen for collecting particles which have passed from the rotary blade assembly through the mesh screen, the manifold directing the particles to a material outlet from the agglomerator.

22. The agglomerator apparatus of claim 21, wherein the radially outer end portions of adjacent blades in the circumferential direction are angled relative to the rotary plane in opposite directions about respective radial axes, whereby the cutting edges of adjacent blades are disposed respectively above and below the rotary plane.

23. The agglomerator apparatus of claim 22, comprising a series of circumferential blade arrays arranged one above the other and rotatable in respective parallel rotary planes about a central, common axis of rotation perpendicular to the rotary planes, the mesh screen circumferentially surrounding the series of blade arrays.

24. The agglomerator of claim 21, wherein the manifold defines a volute form expanding in cross-sectional area towards the material outlet.

25. The agglomerator apparatus of claim 21, wherein the manifold defines an outlet end adjacent the material outlet and an inlet end, the inlet end having a gas inlet for the introduction of a gas flow which flows through the manifold to the material outlet to carry particles that have passed through the mesh screen towards the material outlet.

26. The agglomerator apparatus of claim 25, further comprising a heater to heat the gas flow introduced into the manifold through the gas inlet.

27. The agglomerator apparatus of claim 21, further comprising:
a compressed gas jet disposed adjacent the mesh screen radially outwardly therefrom and arranged to direct a jet of compressed gas at the mesh screen, the mesh screen being mounted for rotation; and a rotary drive for the mesh screen to rotate the mesh screen co-axially with the rotary blade assembly, whereby the circumference of the screen is periodically traversed across the jet of compressed gas.

28. The agglomerator of claim 27, wherein the mesh screen rotary drive rotates the screen in the same direction as the rotation of the rotary blade assembly.

29. An agglomerator apparatus comprising:

a rotary blade assembly including a plurality of blades rotatable in a rotary plane about a central axis, the blades configured to urge material introduced into the rotary blade assembly during operation to follow a generally sinusoidal path relative to the plane of rotation; and a circumferential barrier around the rotary blade assembly configured to block the passage of particles larger than a predetermined desired size.

30. A method of preparing granules, the method comprising, in sequence, the steps of:

mixing particulate material and a liquid to form a mixture;

feeding the mixture into the center of a rotary blade assembly;

inducing the wet mixture to flow radially outward through the rotary blade assembly, whereby the rotary blades cut the mixture into granules; and screening the cut granules through an annular screen coaxially surrounding the rotary blade assembly.

* * * * *